United States Patent [19]

Yeo

[11] Patent Number: 4,903,078

[45] Date of Patent: Feb. 20, 1990

[54] IMAGING APPARATUS WITH VARIABLE APERTURE PLATEN

[75] Inventor: Eugene D. Yeo, Rochester, N.Y.

[73] Assignee: Eastman Kodak Company, Rochester, N.Y.

[21] Appl. No.: 178,699

[22] Filed: Apr. 7, 1988

[51] Int. Cl.⁴ ........................ G03G 21/00; G03B 27/54

[52] U.S. Cl. ........................ 355/218; 355/228; 355/231; 355/67

[58] Field of Search .................. 355/3 R, 3 SH, 14 R, 355/14 SH, 67, 71, 208, 218, 228, 230, 231; 350/331 R

[56] References Cited

U.S. PATENT DOCUMENTS

| | | | |
|---|---|---|---|
| 3,726,589 | 4/1973 | Difulvio et al. . | |
| 3,936,172 | 2/1976 | McVeigh . | |
| 4,012,122 | 3/1977 | McVeigh . | |
| 4,549,223 | 10/1985 | Ozawa et al. . | |
| 4,554,592 | 11/1985 | Yoshida . | |
| 4,673,282 | 6/1987 | Sogame | 355/14 R X |
| 4,692,019 | 9/1987 | Morimoto et al. . | |
| 4,692,021 | 9/1987 | Watanabe . | |
| 4,695,154 | 9/1987 | Watanabe . | |
| 4,697,910 | 10/1987 | Kasuya . | |

FOREIGN PATENT DOCUMENTS

| | | | |
|---|---|---|---|
| 0002938 | 1/1985 | Japan | 355/14 R |
| 0149943 | 7/1986 | Japan | 355/14 R |
| 0210343 | 9/1986 | Japan | 355/14 SH |

OTHER PUBLICATIONS

Xerox Disclosure Journal; Liquid Crystal Platen Masks; vol. 5, No. 5, Sep./Oct. 1980; by J. D. Rees and M. J. Lenhard.

*Primary Examiner*—A. T. Grimley
*Assistant Examiner*—Ed Pipala
*Attorney, Agent, or Firm*—Milton S. Sales

[57] ABSTRACT

Imaging apparatus includes a light transparent platen for holding an original document which may be smaller than the platen. A light source illuminates the platen to expose a document on the platen. Transmittance of light through that portion of the platen not covered by a document is selectively inhibited, preferably by becoming substantially opaque. A light-blocking platen cover is movable between an operative, light blocking position and a non-use position. The light inhibiting operation is actuated when the cover is moved to its non-use position. Document recognition is used for detecting the outline of the original document on the exposure platen to control actuation of the light inhibiting operation, which is preferably effected by a liquid crystalline cell which has a pair of opposed plates, a grid of transparent electrodes interposed between the pair of plates, and a layer of crystalline material interposed between the pair of plates contacting the grid. Document recognition controls energization of the electrodes.

8 Claims, 2 Drawing Sheets

IMAGING APPARATUS WITH VARIABLE APERTURE PLATEN

BACKGROUND OF THE INVENTION

1. Field of the Invention

The present invention relates to imaging means such as document copiers, printers, and fax machines; and more particularly to the document exposure area of such imaging apparatus.

2. Description of the Prior Art

Imaging apparatus such as document copiers, for example electrophotographic copying machines, wherein a document to be reproduced is manually placed upon an exposure platen located at the top of the machine and exposed onto a photosensitive medium are well known in the art. To protect the machine operator from the exposure illumination and to block ambient light from the copying mechanism of the machine, a light cover is frequently provided for placement over the document and the exposure platen during the exposure process. Copiers of this type are advantageously employed to reproduce single documents or the pages of a book.

It is also known in the art to attach a document feeder to the frame or housing of such copiers for use in applications in which a large number of discrete documents are to be copied. The document feeder transports the documents in a programmed sequence to the exposure platen, actuates the copiers to reproduce the documents, and then feeds the documents to an output receptacle. A description of a document feeder accessory for use with copiers of the above mentioned type, can be found in U.S. Pat. No. 3,499,710 to Sahley. As disclosed in this patent, the document feeder has a frame supported on the copiers so that at least a portion thereof overlies the exposure platen and the overlying portion can be readily moved away from the exposure platen to a non-use position to provide for manually positioning a book or the like on the platen.

In its operative position overlying the exposure platen, the document feeder itself functions as a light cover to block the entrance of ambient light and to shield the exposure illumination and is to be included in the meaning of the phase "light cover" as used herein. However, when the document feeder is moved to a non-use position away from the exposure window to permit the exposure of books or individual documents, the ambient light surrounding the exposure platen may reduce the quality of the reproduction produced by the copier and an operator subjected to the exposure illumination may find the illumination irritating or even harmful.

It has been suggested in commonly assigned U.S. Pat. No. 3,726,589 to provide a retractable light cover positionable over the exposure platen when the document feeder is moved to its non-use position. The retractable light cover is stored wrapped on a spring loaded storage spool mounted within the housing of the copying machine when the document feeder is in its operative position overlying the exposure platen. When the document feeder is moved to its non-use position, the light cover may be pulled out to cover the exposed platen.

While such apparatus is an effective light shield, it is somewhat awkward and time consuming to use, particularly when many pages of a book or books are to be copied.

SUMMARY OF THE INVENTION

It is an object of the present invention to provide an easy to use auxiliary light shield which is actuatable during the single document and book exposure modes to inhibit ambient light from passing through the exposure platen and which provides protection to the operator from the exposure light source.

In accordance with the above, the present invention includes imaging apparatus comprising a light transparent platen for holding an original document which may be smaller than the platen. A light source illuminates the platen to expose a document on the platen. Actuatable means selectively inhibits the transmittance of light through that portion of the platen not covered by a document, preferably by becoming substantially opaque.

In a preferred embodiment of the present invention, a light-blocking platen cover is movable between an operative, light blocking position and a non-use position. The light inhibiting means is actuated when the cover is moved to its non-use position. Document recognition means are used for detecting the outline of the original document on the exposure platen to control actuation of the light inhibiting means.

Preferably, the light inhibiting means includes a liquid crystalline cell which has a pair of opposed plates, a grid of transparent electrodes interposed between said pair of plates, and a layer of crystalline material interposed between said pair of plates contacting said grid. The document recognition means controls energization of the electrodes.

BRIEF DESCRIPTION OF THE DRAWINGS

Other objects and advantages of the present invention will become apparent upon reading the following detailed description and upon reference to the drawings, in which.

DESCRIPTION OF THE PREFERRED EMBODIMENT

Figure 1:
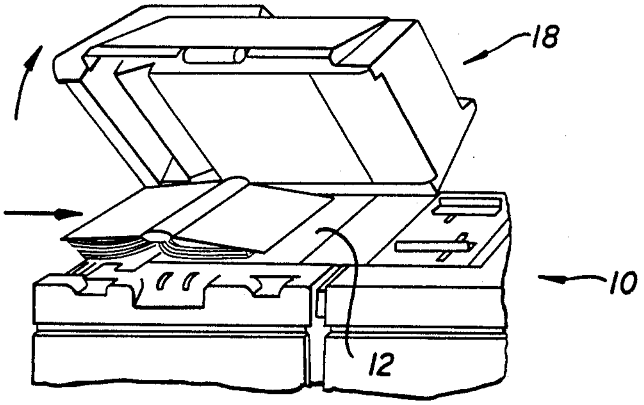
FIGS. 1–3 are perspective views of a portion of a conventional electrophotographic copier in various modes of operation.

Referring now to the drawings, and in particular to FIG. 1, there is shown a conventional electrophotographic copier 10 having an exposure platen 12 through which a document to be reproduced is exposed to the copier (not shown) of the machine 10. Upon actuation of copier 10, an image of the document positioned on exposure platen 12 is projected onto a photosensitive medium (not shown). The image so projected is processed to produce an electrophotographic copy of the document which is subsequently discharged from the copier.

A conventional document feeder 18 is mounted as shown on the housing of copier 10. The document feeder illustrated is that found in the Kodak Ektaprint 250 duplicator, but the present invention is useful with copiers having feeders of various forms as well as with copiers which do not have feeders at all.

Figure 2:
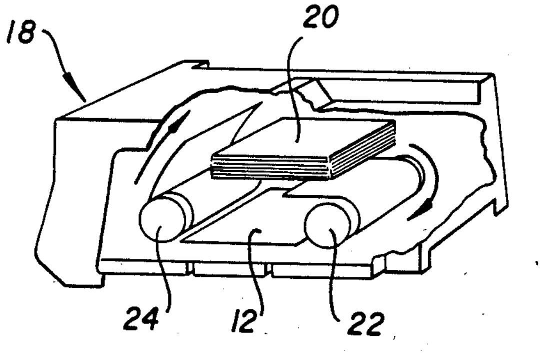
Figure 3:
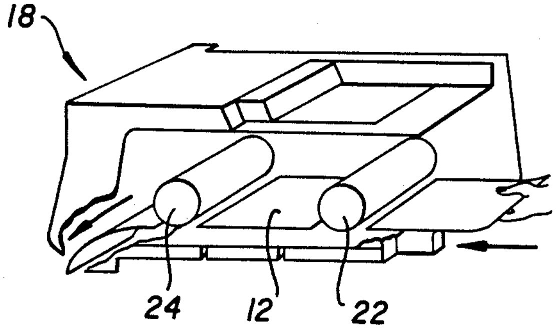

Feeders are used in applications, such as shown in FIG. 2, in which a plurality of individual documents are to be copied in a programmed sequence. In the operative position of document feeder 18 shown in FIG. 2, a stack of documents 20 is loaded into a supply hopper. When document feeder 18 is energized, a document is fed from the bottom of the stack around a roller 22, to a rest position on explosure platen 12 where the document pauses for exposure. The document is exposed and then fed around a second roller 24 to the top of stack 20. The process is repeated until all of the documents in the document stack have been copied. As illustrated in FIG. 3, single documents may be manually fed into a mechanism for positioning them in series over platen 12.

If a book is to be exposed to the copier of copying machine 10, document feeder 18 is pivoted upwardly as shown in FIG. 1 to a storage or non-use position so that the document or book to be copied can be placed by the operator directly on exposure platen 12. The feeder is counterbalanced such that the rotational moment sum allows a clockwise moment when the apparatus is up and a counterclockwise moment when the apparatus is down as viewed in FIG. 1. The apparatus passes through equilibrium as it is pivoted.

In its operative position overlying exposure platen 12, the document feeder blocks ambient light from reaching exposure platen 12 and hides the exposure illumination. However, when copier 10 is used without document feeder 18, i.e., when the document feeder is pivoted to its FIG. 1 non-use position, exposure platen 12 is uncovered. The present invention includes an auxiliary light shield which is usable during the single document or book exposure mode of operation illustrated in FIG. 1 to inhibit ambient light from passing through exposure platen 12, and which provides protection to the operator from the exposure light source (not shown).

From the foregoing, the advantages of the present invention are readily apparent. A copier having a light cover mounted thereon and overlying the exposure platen is provided with apparatus which changes the configuration of the processing station to permit the processing of documents which may be either discrete elements fed in seriatim or single elements such as the pages of a book. To inhibit ambient light which may reduce the quality of the copy produced by the machine from passing through the exposure platen and to protect the operator from the exposure illumination, a selectively activated light shield is provided to inhibit light through the exposure platen during document exposure.

According to the preferred embodiment of the present invention, platen 12 is a liquid crystalline platen, and may be constructed similar to that shown in U.S. Pat. No. 4,012,122, which issued to J. H. McVeigh on March 15, 1977. Liquid crystals are fluids that are partially ordered so that they have some of the optical properties of crystal. There are two types of crystals used in displays; dynamic-scattering liquid crystals and field-effect liquid crystals. Dynamic-scattering liquid crystals are clear in the absence of an electric field. When an electric field is applied thereto, they turn cloudy and scatter light. This effect is like frosting a piece of glass.

Generally, a liquid crystalline imaging cell includes a strip of microglass paper impregnated with liquid crystalline material sandwiched between two substrates. Each of the substrates has a conductive material plated thereon. By the present invention, I have provided a transparent exposure platen for supporting an original document which may selectively be made substantially opaque to mask portions of the platen not covered by the original document.

Platen 12 preferably contains a substantially rectangular liquid crystalline imaging cell illustrated in detail in FIG. 3. The imaging cell includes a pair of plates, generally designated by the reference numerals 30 and 32. Plates 30 and 32 are substantially transparent. A grid of transparent electrodes 34 is interposed between plates 30 and 32. On the inner surface of plate 32 is an array of transparent conductive strips 36 all running in one direction. Four strips or electrodes are shown which have parallel longitudinal axes. However, it will be understood that in actual practice a larger number of electrodes may be employed. On the inner surface of plate 30 are arranged an array of transparent electrodes 38 having parallel longitudinal axes and being positioned substantially perpendicularly to the direction of conductive strips 36 on plate 32. Again, it will be understood that in actual practice, a much larger number of electrodes may be arranged on the inner surface of plate 30. A layer of liquid crystalline material 40 is located in the space between plates 30 and 32. Preferably, plates 30 and 32 are transparent electrically conductive electrodes. Each plate includes a thin transparent electrically conductive layer of tin oxide overlying a transparent glass substrate. The tin oxide layer is etched away so as to form a plurality of parallel lines of tin oxide thereon. For example, the tin oxide lines 36 on plate 32 would be substantially perpendicular to the tin oxide lines 36 on plate 30. Thus, the pair of plates together form a rectangular grip structure. A liquid crystalline film or layer 40 is interposed between plates 30 and 32. This layer of liquid crystalline material is the active element of the imaging cell. A field is created between the electrodes by means of an external circuit, generally designated by the reference numeral 42 which typically comprises a source of potential 44 which is connected across the electrodes through leads 46. Circuit 42 may also contain suitable switching means. Potential source 44 may be either D.C., A.C., or a combination thereof.

When an electric field of sufficient magnitude, e.g. above about 3000 volts/centimeter, is applied across liquid crystalline film 40 the optical properties of the liquid crystalline material change and the liquid crystalline film, which is substantially transparent prior to the application of the field becomes "frosted", i.e. exhibits dynamic scattering. Thus, the imaging cell can functional as a light shutter since a large percentage, e.g. about 90% of the light, would be scattered while only a small percentage, e.g. about 10% would be transmitted. As used herein, the phrase "substantially opaque" is intended to include frosted material.

As alternate manner in which the grid structure may be formed would be to utilize glass or plastic plates and have grid lines formed from conductive materials such as tin, indium oxide, aluminum, chromium, tin oxide or any other suitable conductor evaporated onto the glass or plastic plates.

It will be understood by those skilled in the art that when two electrode strips, each being perpendicular to one another, are energized with the applied voltage, the portion of the liquid crystalline cell corresponding to the intersection of the two electrodes which have been energized will become darker than the remaining area of the imaging cell. By energizing more than one set of electrode strip predetermined areas are made to appear darker, or substantially opaque.

Figure 4:
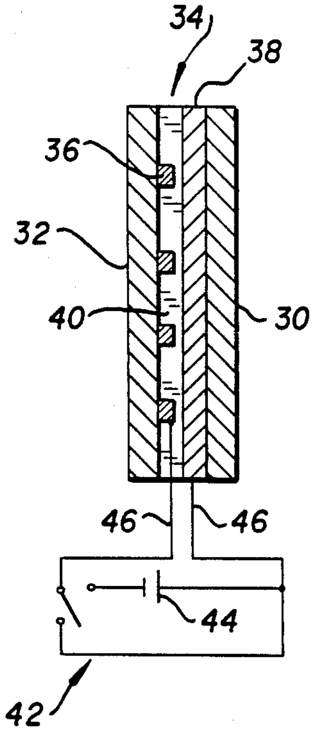
FIG. 4 is a sectional elevational view illustrating a liquid crystalline imaging cell employed in the preferred embodiment of the present invention.
Figure 5:
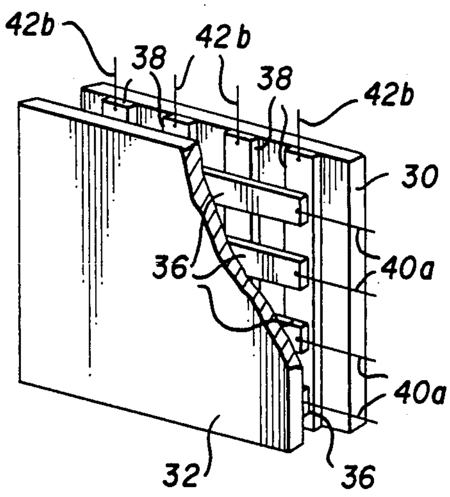
FIG. 5 is a schematic perspective view, partially fragmentary of the FIG. 4 liquid crystalline imaging cell.

FIG. 4 depicts plates 30 and 32 in perspective. As shown therein, plates 30 and 32 are sandwiched together with the liquid crystalline material interposed therebetween. Conductors 36 extend in a horizontal direction and are formed on plate 32. Similarly, conductors 38 are formed on plate 30 and extend in a substantially vertical direction. Electric lead wires **46*a* are connected to each of the grids 36. Similarly, electric lead wires 46*b* are connected to conductors 38. Thus when a selected lead wire 46*a* is excited and the corresponding selected lead wire 46*b*** is excited, a portion of the imaging cell is darkened or becomes opaque and inhibits light transmission therethrough. When this arrangement is employed as a platen, it may mask selected portions of the platen. This is achieved by exciting the appropriate regions of the imaging cell so as to prevent light rays from passing therethrough. Thus, the light rays will only pass through the substantially transparent portions of the imaging cell illuminating the orignal document disposed therebehind and producing an electrostatic latent image on the photoconductive surface corresponding to the unmasked portions of the original document.

Figure 6:
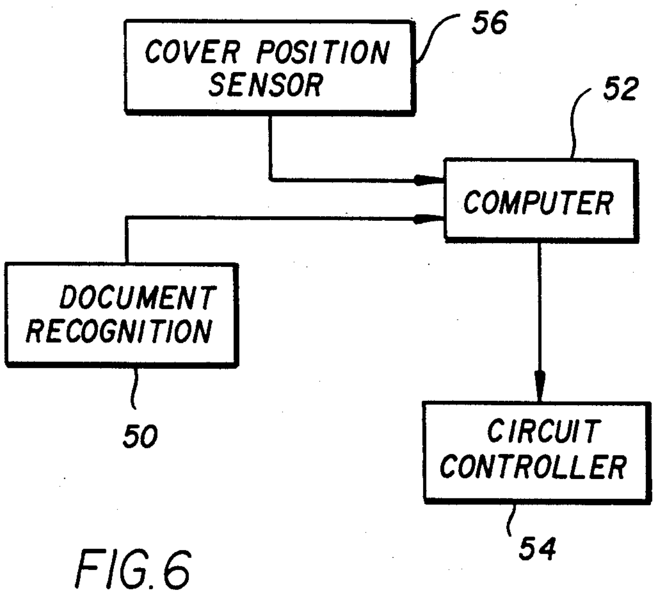
FIG. 6 is a schematic block diagram of the control system for the liquid crystalline imaging cell of FIGS. 3 and 4.

Referring to FIG. 6, means 50 are provided for detecting the outline of the original document on the exposure platen. This process is referred to as "document recognition" and various techniques are known in the art. See for example U.S. Pat. Nos. 4,554,592 issued to T. Yoshida on November 19, 1985; 4,692,019 issued to K. Morimoto et al on September 8, 1987; 4,692,021 issued September 8, 1987 to J. Watanabe; and 4,695,154.

Data representing the outline of the original document on exposure platen 12 is provided to a general purpose computer 52 which is programmed to drive a circuit controller 54 to activate selective conductive strips 36 and 38; making those portions of the exposure platen not covered by the original document substantially opaque. Programming of commercially available computers is conventional skill well understood in the art. This disclosure is written to enable a programmer having ordinary skill in the art to produce an appropriate control program for the computer. The particular details of any such program would, of course, depend on the computer architecture and operating system.

The masking system is preferably disabled when the platen cover is in its lowered, light blocking position. A sensor 56 signals the position of the cover to the computer.

The invention has been described in detail with particular reference to preferred embodiments thereof, but it will be understood that variations and modifications can be effected within the spirit and scope of the invention.

I claim:

1. Imaging apparatus comprising:
- a light transparent platen for holding an original document which may be smaller than the platen;
- a light source for illuminating the platen to expose a document on the platen;
- actuatable means for selectively inhibiting the transmittance of light through that portion of the platen not covered by a document;
- a light-blocking cover for the platen, said cover being movable between an operative, light blocking position and a non-use position; and

- means, responsive to movement of said cover to its non-use position for actuating said light inhibiting means.

2. Imaging apparatus comprising:
- a light transparent platen for holding an original document which may be smaller than the platen;
- a light source for illuminating the platen to expose a document on the platen;
- actuatable means for selectively inhibiting the transmittance of light through that portion of the platen not covered by a document;
- a light-blocking cover for the platen, said cover being movable between an operative, light blocking position and a non-use position;
- means, responsive to movement of said cover to its non-use position for actuating said light inhibiting means;
- document recognition means for detecting the outline of the original document on the exposure platen; and
- means responsive to said document recognition means for controlling actuation of said light inhibiting means.

3. Imaging apparatus comprising:
- a light transparent platen for holding an original document which may be smaller than the platen;
- a light source for illuminating the platen to expose a document on the platen;
- actuatable means for selectively inhibiting the transmittance of light through that portion of the platen not covered by a document, wherein said light inhibiting means includes a liquid crystalline cell having a pair of opposed plates, a grid of transparent electrodes interposed between said pair of plates, and a layer of crystalline material interposed between said pair of plates contacting said grid;
- a light-blocking cover for the platen, said cover being movable between an operative, light blocking position and a non-use position; and
- means, responsive to movement of said cover to its non-use position for actuating said light inhibiting means.

4. Imaging apparatus as set forth in claim 3 further comprising:
- document recognition means for detecting the outline of the original document on the exposure platen; and
- means responsive to said document recognition means for controlling energization of said electrodes.

5. Imaging apparatus comprising:
- a light transparent platen for holding an original document which may be smaller than the platen;
- a light source for illuminating the platen to expose a document on the platen;
- selectively operable means for rendering that portion of the platen not covered by a document substantially opaque;
- a light-blocking cover for the platen, said cover being movable between an operative, light blocking position and a non-use position; and
- means, responsive to movement of said cover to its non-use position for actuating said rendering means.

6. Imaging apparatus comprising:
- a light transparent platen for holding an original document which may be smaller than the platen;

a light source for illuminating the platen to expose a document on the platen;

selectively operable means for rendering that portion of the platen not covered by a document substantially opaque;

document recognition means for detecting the outline of the original document on the exposure platen;

a light-blocking cover for the platen, said cover being movable between an operative, light blocking position and a non-use position;

means, responsive to movement of said cover to its non-use position for actuating said light rendering means; and means responsive to said document recognition means for controlling actuation of said rendering means.

7. Imaging apparatus comprising a light transparent platen for holding an original document which may be smaller than the platen;

a light source for illuminating the platen to expose a document on the platen;

selectively operable means for rendering that portion of the platen not covered by a document substantially opaque, wherein said rendering means includes a liquid crystalline cell having a pair of opposed plates, a grid of transparent electrodes interposed between said pair of plates, and a layer of crystalline material interposed between said pair of plates contacting said grid;

a light-blocking cover for the platen, said cover being movable between an operative, light blocking position and a non-use position; and means, responsive to movement of said cover to its non-use position for actuating said light rendering means.

8. Imaging apparatus as set forth in claim 7 further comprising:

document recognition means for detecting the outline of the original document on the exposure platen; and means responsive to said document recognition means for controlling energization of said electrodes.

* * * * *